(12) United States Patent
Inagaki et al.

(10) Patent No.: US 6,939,639 B2
(45) Date of Patent: Sep. 6, 2005

(54) FUEL CELL SEPARATOR

(75) Inventors: Toshiyuki Inagaki, Toyota (JP); Tsuyoshi Takahashi, Nishikamo-gun (JP); Tsutomu Ochi, Toyota (JP); Katsuhiro Kajio, Anjo (JP); Kouetsu Hibino, Nisshin (JP); Yasuyuki Asai, Toyota (JP); Yixin Zeng, Kariya (JP); Toshiyuki Suzuki, Toyota (JP); Yuichi Yagami, Toyota (JP); Mikio Wada, Nishikamo-gun (JP); Haruhisa Niimi, Tokai (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 174 days.

(21) Appl. No.: 10/243,745

(22) Filed: Sep. 16, 2002

(65) Prior Publication Data
US 2003/0064272 A1 Apr. 3, 2003

(30) Foreign Application Priority Data
Oct. 1, 2001 (JP) .......................... 2001-305239

(51) Int. Cl.$^7$ ................................. H01M 8/04
(52) U.S. Cl. ................. 429/39; 429/38; 429/34
(58) Field of Search .................. 429/38, 39, 34

(56) References Cited

U.S. PATENT DOCUMENTS

| 6,365,295 B1 * | 4/2002 | Matsukawa et al. ........... 429/34 |
| 6,858,338 B2 * | 2/2005 | Sugiura et al. ................ 429/32 |
| 2004/0137298 A1 * | 7/2004 | Sugiura et al. ................ 429/32 |

FOREIGN PATENT DOCUMENTS

| JP | (A) 59-31568 | 2/1984 |
| JP | (A) 2000-228207 | 8/2000 |

* cited by examiner

Primary Examiner—John S. Maples
(74) Attorney, Agent, or Firm—Kenyon & Kenyon

(57) ABSTRACT

A fuel cell separator is pressed so that one side thereof defines a gas flow channel and that the other side thereof defines a coolant flow channel. A width $d_G$ and a cross-sectional area $S_G$ of the gas flow channel and a width $d_W$ and a cross-sectional area $S_W$ of the coolant flow channel satisfy a relationship: $d_G \geq d_W$ or a relationship: $S_G \geq S_W$.

4 Claims, 7 Drawing Sheets

FUEL CELL SEPARATOR

INCORPORATION BY REFERENCE

The disclosure of Japanese Patent Application No. 2001-305239 filed on Oct. 1, 2001 including the specification, drawings and abstract is incorporated herein by reference in its entirety.

BACKGROUND OF THE INVENTION

1. Field of the Invention

The invention relates to a fuel cell separator (used for a solid polymer electrolyte type fuel cell or the like).

2. Description of the Related Art

A solid polymer electrolyte type fuel cell is composed of layered modules, each of which is composed of a membrane-electrode assembly (MEA) and a separator. The MEA is composed of an electrolytic membrane made of an ion-exchange membrane, an electrode (anode or fuel electrode) made of a catalytic layer disposed on one face of the electrolytic membrane, and an electrode (cathode or air electrode) made of a catalytic layer disposed on the other face of the electrolytic membrane. Diffusion layers are disposed between the anode-side catalytic layer and the separator and between the cathode side catalytic layer and the separator, respectively. A fuel gas flow channel through which a fuel gas (hydrogen) is supplied to the anode is defined by the separator on the side of the anode with respect to the MEA. An oxidative gas flow channel through which an oxidative gas (oxygen, air as a rule) is supplied to the cathode is defined by the separator on the side of the cathode with respect to the MEA. Terminals, insulators, and end plates are disposed at opposed ends of a layered-module body in a module-layering direction, whereby a stack is constructed. This stack is clamped in the module-layering direction and is fixed by means of bolts and a fastening member (e.g., a tension plate) extending in the module-layering direction outside the layered-module body.

In the solid polymer electrolyte type fuel cell, a reaction for decomposing hydrogen into hydrogen ion and electron occurs on the anode-side, and the hydrogen ion moves to the cathode side through the electrolytic membrane. A reaction for producing water from oxygen, hydrogen ion, and electron (the electrons produced in the anodes of adjacent ones of MEA's reach the cathode side through the separator, or the electrons produced in the anode of a cell at one end of the layered-module body reaches the cathode of a cell at the other end of the layered-module body through an external circuit) occurs on the cathode side.

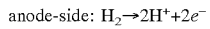

anode-side: $H_2 \rightarrow 2H^+ + 2e^-$

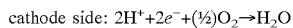

cathode side: $2H^+ + 2e^- + (½)O_2 \rightarrow H_2O$

In order to cool Joule heat and the heat of the reaction for producing water on the cathode side, a coolant flow channel through which a coolant (cooling water as a rule) flows is defined by adjacent ones of separators, so that the fuel cell is cooled.

Japanese Patent Application Laid open No. 2000-228207 discloses a metal separator according to an art related to the invention. This separator is formed by pressing a metal. A reactive gas and cooling water are caused to flow along front and back sides of the separator, respectively. FIG. 6 shows a separator 10 disclosed in the aforementioned publication. FIG. 7B is an enlarged view of an encircled region of the separator 10 which is indicated by A in FIG. 6, that is, a region around a joint portion between an opening portion 110 and gas flow channels 180. As shown in FIG. 7A, a gas flows from the opening portion 110 into the flow channels 180 via gas flow channel end portions 180a. Convex portions 190 separate the flow channels 180 from one another. FIG. 7B is a cross-sectional view of the gas flow channels taken along a line VB—VB in FIG. 7A. FIG. 8A is an enlarged view of an encircled region of the separator which is indicated by B in FIG. 6, that is, a region around a joint portion between an opening portion 150 and an end portion of a coolant flow channel 120. A coolant flows from the opening portion 150 into a channel 200 via a coolant flow channel inlet portion 200a. FIG. 8B is a cross-sectional view of the coolant flow channel taken along a line VIB—VIB in FIG. 8A. In the separator disclosed in the aforementioned publication, as shown in FIGS. 7A and 7B and FIGS. 8A and 8B, the width of the coolant flow channel is larger than the width of the gas flow channels. In addition to the separator disclosed in the aforementioned publication, other metal separators that have been actually manufactured are designed such that the width of a coolant flow channel is larger than the width of gas flow channels.

However, if a gas flow channel is defined by a front face of a separator that is designed to be pressed to define flow channels as in the case of a metal separator, the width and cross-sectional area of a coolant flow channel defined by a back face of the separator uniquely determined. In this case, if the width of the coolant flow channel is made larger than the width of the gas flow channel as in the case of the related art, the following problems are caused.

(1) A separator portion at a groove bottom portion of the coolant flow channel presses a diffusion layer and adversely affects the diffusibility of gas into a catalytic layer. Therefore, if the width of the coolant flow channel is increased, the areas of cells that can be effectively utilized to generate electricity are reduced. Since the amount of cooling water is increased and the metal has a high thermal conductivity, excessive cooling occurs, which tends to cause flooding in an oxidative gas downstream portion. Further, the amount of cooling water is increased and the thermal capacity of water is increased, whereby the cooling controllability may be deteriorated in some cases.

SUMMARY OF THE INVENTION

It is an object of the invention, to provide a fuel cell separator whose flow channels are formed by pressing, which can offer an increased area that can be effectively utilized to generate electricity, and which can prevent a fuel cell from being excessively cooled.

A fuel cell separator according to a first aspect of the invention comprises a separator having a first face And a second face that is formed on the other side of the first face. The separator is at least partially pressed into a convexo-concave shape. A concave portion formed in the first face defines a gas flow channel having a width $d_G$ and a cross-sectional area $S_G$. A concave portion formed in the second face defines a coolant flow channel having a width $d_W$, and a cross-sectional area $S_W$. The width $d_G$ and the cross-sectional area $S_G$ of the gas flow channel and the width $d_W$ and the cross-sectional area $S_W$ of the coolant flow channel satisfy a relationship: $d_G \geq d_W$ or a relationship: $S_G \geq S_W$ In the fuel cell separator according to the aforementioned first aspect of the invention, the width of the coolant flow channel is smaller than the width of the gas flow channel ($d_G \geq d_W$) and thus is smaller than the width of the coolant flow channel of the aforementioned related art. Further, if the flow channels are not grooved, it is impossible to specify $d_G$ or $d_W$. However, even in such a case, since a relationship: cross-sectional area=flow channel height×flow channel width is satisfied, the flow channel width can be specified once the flow channel height has become known. Hence, it is also appropriate that the coolant flow channel cross-sectional area, be smaller than the gas flow channel cross-sectional area ($S_G \geq S_W$).

Since the coolant flow channel width is reduced, the areas of diffusion layers that are pressed by groove bottom portions of the coolant flow channel of the separator are reduced, and the areas of those portions of the diffusion layers which exhibit poor diffusibility of gas to catalytic layers are reduced. As a result, the areas of cells which can be effectively utilized to generate electricity (the areas of the catalytic layers to which a sufficient amount of gas is diffusively supplied) are increased.

Further, since the coolant flow channel width is reduced, the amount of cooling water is reduced. Hence, the cells are prevented from being excessively cooled and the thermal capacity of cooling water is reduced as well, which brings about improved controllability. Further, since excessive cooling is prevented, an oxidative gas downstream portion is inhibited from being flooded by water that has been produced.

It is also appropriate that a flow channel defining portion of the separator be made of a material having a high thermal conductivity. In this case, since the flow channel defining portion exhibits a high thermal conductivity, cooling tends to be excessive. However, since the condition that the width $d_W$ of the coolant flow channel be smaller than the width $d_G$ of the gas flow channel (or the condition that the cross-sectional area $S_d$ of the coolant flow channel be smaller than the cross-sectional area $S_G$ of the gas flow channel) is satisfied as a premise, the amount of cooling water is small and excessive cooling can be prevented.

BRIEF DESCRIPTION OF THE DRAWINGS

The foregoing and further objects, features and advantages of the present invention will become apparent from the following description of preferred embodiments with reference to the accompanying drawings, wherein.

DETAILED DESCRIPTION OF PREFERRED EMBODIMENT

A fuel cell separator according to the invention will be described hereinafter with reference to FIGS. 1 to 3.

The fuel cell into which the separator according to the invention is built is a solid polymer electrolyte type fuel cell 10. The fuel cell 10 according to the invention is installed, for example, in a fuel cell powered vehicle. It is to be noted, however, that the fuel cell 10 may also be used for other purposes instead of being installed in a vehicle.

Figure 1:
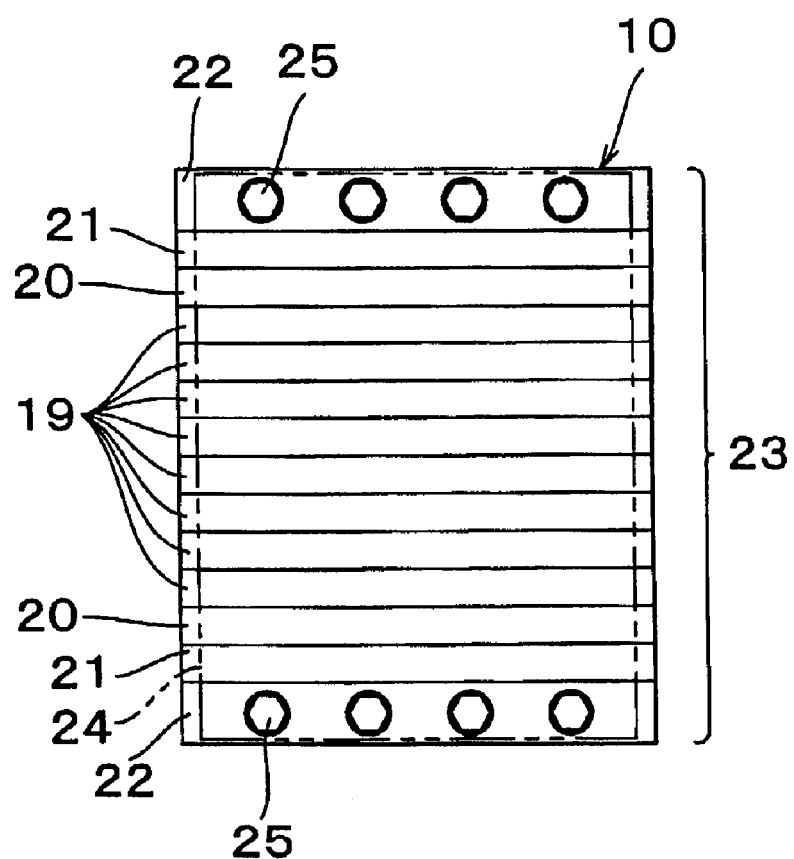
FIG. 1 is a general schematic view of a fuel cell equipped with a separator.
Figure 2:
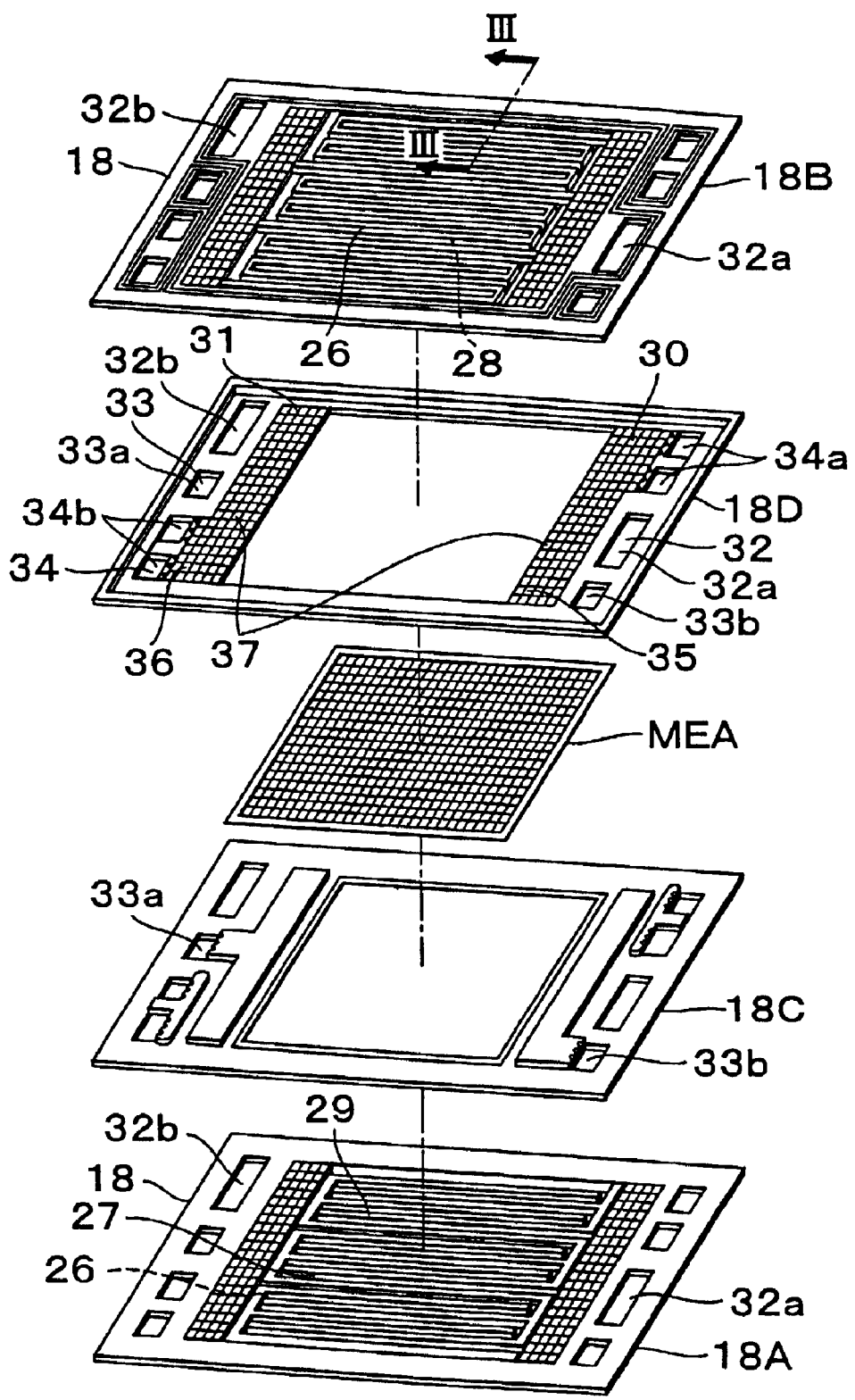
FIG. 2 is an exploded perspective view of one module of the fuel cell equipped with the separator.
Figure 3:
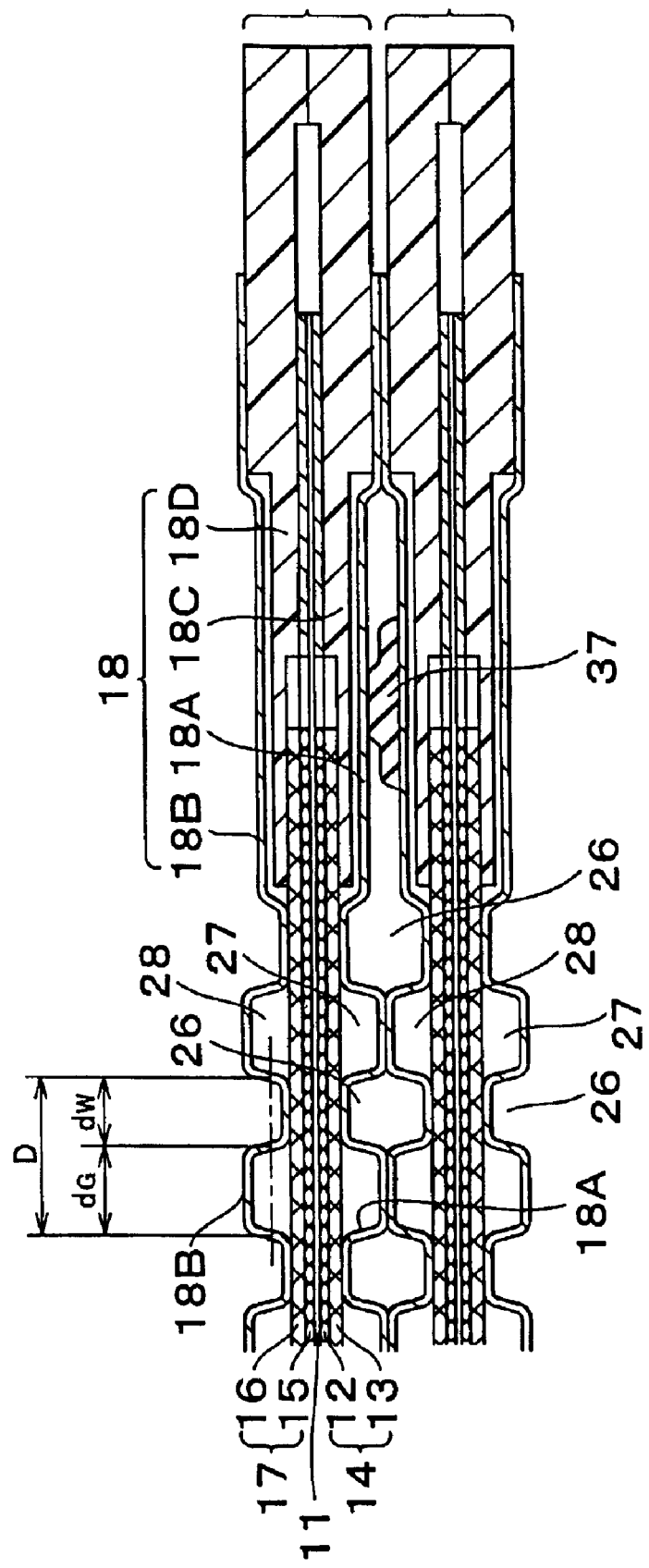
FIG. 3 is an enlarged cross-sectional view of two modules of part of the fuel cell equipped with the separator.

As shown in FIGS. 1 to 3, the solid polymer electrolyte fuel cell 1p is composed of layered modules 19, each of which is composed of separators 18 and a membrane-electrode assembly (MEA). The MEA is composed of an electrolyte membrane 11 made of an ion-exchange membrane, an electrode 14 (anode or fuel electrode) made of a catalytic layer 12 disposed on one face of the electrolyte membrane 11, and an electrode 17 (cathode or air electrode) made of a catalytic layer 15 disposed on the other face of the electrolyte membrane 11. A diffusion layer 13 is disposed between the anode-side catalytic layer 12 and the separator 18, and a diffusion layer 16 is disposed between the cathode-side catalytic layer 15 and the separator 18. The diffusion layer 13 maybe regarded as part of the anode 14, and the diffusion layer 16 may be regarded as part of the cathode 17. Terminals 20, insulators 21, and end plates 22 are disposed at opposed ends of a layered-module body in a module layering direction, whereby a stack 23 is constructed. The stack 23 is clamped in the module-layering direction and is fixed by means of bolts 25 and a fastening member 24 (e.g., a tension plate) extending in the module-layering direction outside the layered-module body.

A fuel gas flow channel 27 through which a fuel gas (hydrogen) is supplied to the anode 14 is defined by the separator 18 on the side of the anode 14 with respect to the MEA. An oxidative gas flow channel 28 through which an oxidative gas (oxygen, or air as a rule) is supplied to the cathode 17 is defined by the separator 18 on the side of the cathode 17 with respect to the MEA.

A coolant flow channel 26 is disposed between the separator 18 of one of adjacent ones of the modules and the separator 18 of the other of the adjacent ones of the modules. A coolant (cooling water as a rule) is caused to flow through the coolant flow channel 26 and cools the fuel cell that is about to be heated up by Joule heat and reactive heat. The coolant flow channel 26 is defined by the separator 18 on the back side thereof that is opposite the side thereof where a gas flow channel (the fuel gas flow channel 27 or the oxidative gas flow channel 28) is defined.

The catalytic layers 12, 15 are made of platinum (Pt), carbon (C) carrying platinum (Pt), and an electrolyte. The diffusion layers 13, 16 contain carbon (C) as their main constituent and are permeable to air.

The gas flow channel (the fuel gas flow channel 27 or the oxidative gas flow channel 28) is defined by the separator 18 on one side thereof, and the coolant flow channel 26 is defined by the separator 18 on the other side thereof. The separator 18 has pressed portions (18A and 18B). For instance, the pressed portions (18A and 18B) are made of a metal. However, it is not absolutely required that the pressed portions (18A and 18B) be made of a metal. It is also appropriate that the pressed portions (18A and 18B) be formed by pressing conductive resin. The following description will handle a case where the pressed portions (18A and 18B) are made of a metal.

In the case where the pressed portions (18A and 18B) are made of a metal, the separator 18 is composed of metal separators 18A, 18B and resinous frames 18C, 18D.

As shown in FIG. 3, when the separator 18 sandwiches the MEA, the resinous frames 18C, 18D, whose portions corresponding to the MEA are perforated, are respectively disposed on the metal separators 18A, 18B on the side of the MEA. The metal separator 18A, the resinous frame 18C, the MEA, the resinous frame 18D, and the metal separator 18B are layered in this order. The resinous frames 18C, 18D have the perforated portions corresponding to the MEA. Hence, as far as a region corresponding to the MEA is concerned, the metal separator 18A; the MEA, and the metal separator 18B are layered in this order. Since the MEA does not overlap with the resinous frames 18C, 18D, the metal separator 18A, the resinous frame 18C, the resinous frame 18D, and the metal separator 18B are layered in this order. The region corresponding to the MEA constitutes a generating portion of the fuel cell.

The metal separators 18A, 18B are impermeable and are formed, for example, by plating metal plates (e.g., stainless plates) with a highly conductive metal (e.g, Nickel-plating). The metal separator 18A and the resinous frame 18C separate a fuel gas (e.g., hydrogen) and a coolant (e.g., cooling water) from each other. The metal separator 18B and the resinous frame 18D separate an oxidative gas (e.g., oxygen, air as a rule) and the coolant from each other. The metal separators 18A, 18B form an electric conduit through which electrons flow from an anode to a cathode of adjacent cells.

The fuel gas flow channel 27 is defined by the metal separator 18A on one side thereof (which is opposed to the MEA) in the portion corresponding to the electric generating portion of the fuel cell, and the coolant flow channel (cooling water flow channel) 26 is defined by the metal separator 18A on the other side thereof. Similarly, the oxidative gas flow channel 28 is defined by the metal separator 18B on one side thereof (which is opposed to the MEA) in the portion corresponding to the electric generating portion of the fuel cell, and the coolant flow channel (cooling water flow channel) 26 is defined by the metal separator 18B on the other side thereof. These gas flow channels are formed into a convexo-concave shape by pressing.

A coolant manifold 32 connected to the coolant flow channel 26, a fuel gas manifold 33 connected to the fuel gas flow channel 27, and an oxidative gas manifold 34 connected to the oxidative gas flow channel 28 are formed through opposed portions 30, 31 of the metal separators 18A, 18B and the resinous frames 18C, 18D. Each of the opposed portions 30 and a corresponding one of the opposed portions 31 are opposed to each other across the electric generating portion (the portion corresponding to the MEA) of the fuel cell. An inlet side coolant manifold 32a, an outlet side fuel gas manifold 33b, and an inlet side oxidative gas manifold 34a are formed in one of each pair of the opposed portions 30, 31 that are opposed to each other across the portion corresponding to the electric generating portion of the fuel, namely, in the opposed portion 30. An outlet side coolant manifold 32b, an inlet-side fuel gas manifold 33a, and an outlet-side oxidative gas manifold 34b are formed in the other opposed portion 31.

A straightening portion 35 for enlarging the flow from the manifold length to the entire width of the electric generating portion of the fuel cell is formed between each of inlet-side manifolds and the flow channel of the generating portion. A straightening portion 36 for narrowing the flow from the entire width of the electric generating portion of the fuel cell to the manifold length is formed between each of outlet-side manifolds and the flow channel of the electric generating portion. The cooling water flow channel, the fuel gas flow channel, and the air flow channel are sealed from one another. A reference numeral 37 in FIG. 3 denotes a sealing member for preventing a coolant from entering a space between the modules.

Figure 4:
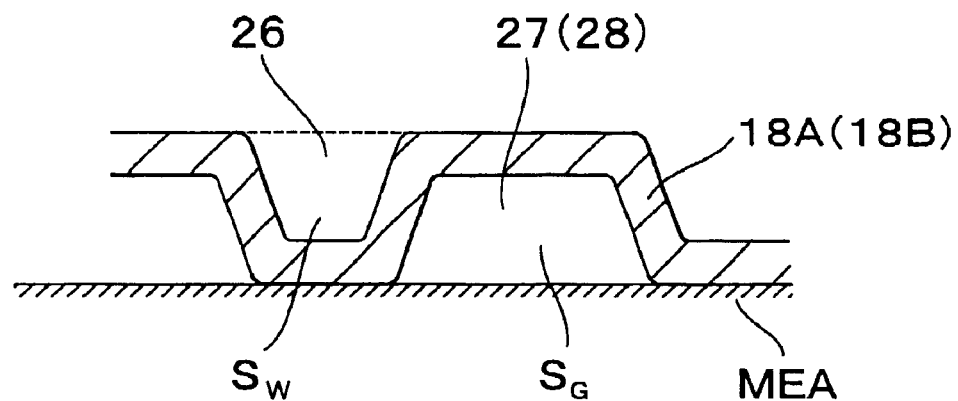
FIG. 4 is a view showing relation between cross-sectional area of gas flow channel and cross-sectional area of coolant flow channel.
Figure 5:
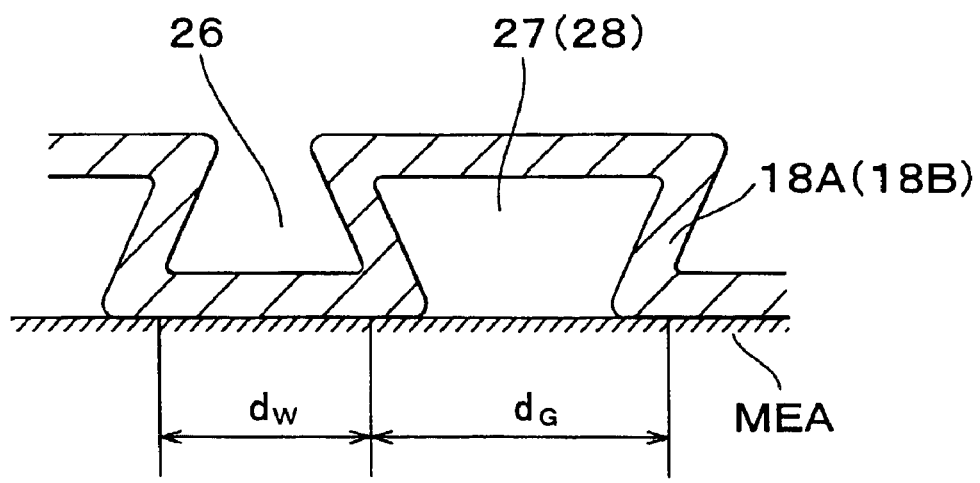
FIG. 5 is a view showing relation between width of gas flow channel and width of coolant flow channel.
Figure 6:
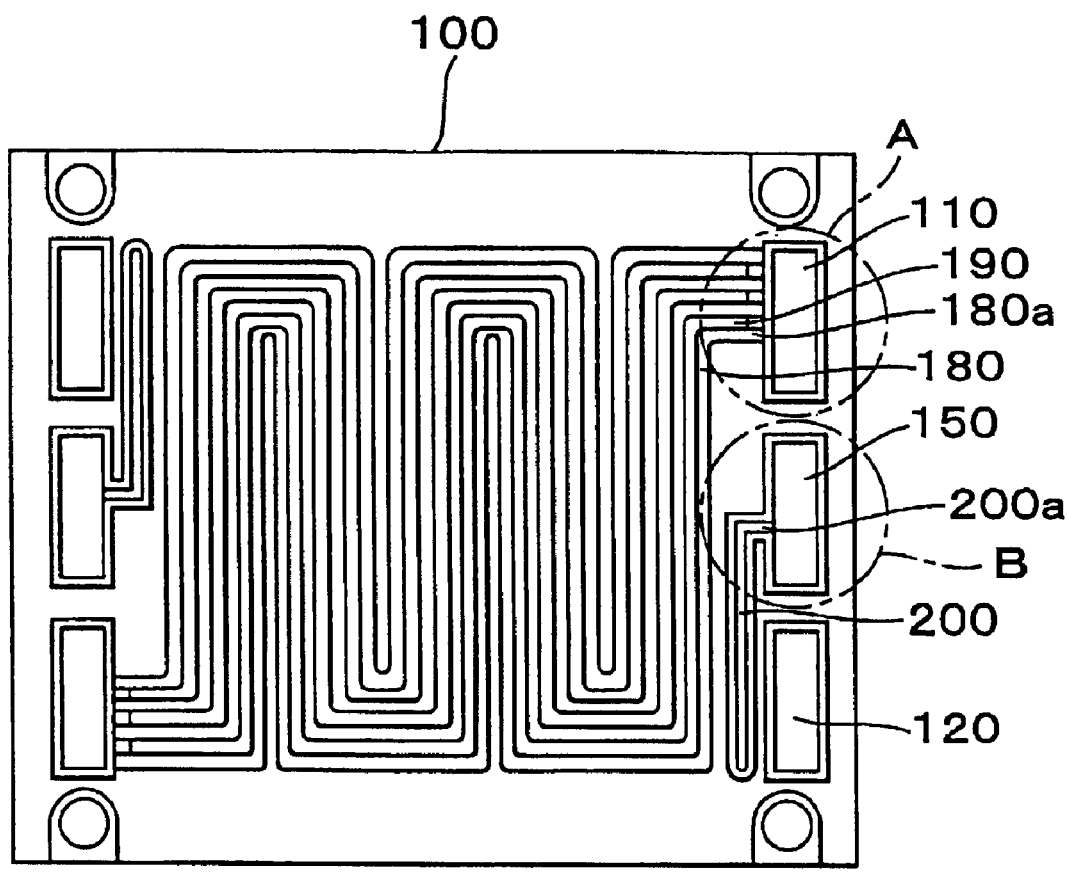
FIG. 6 is a general schematic view of a separator according to an art related to the invention.
Figure 7A:
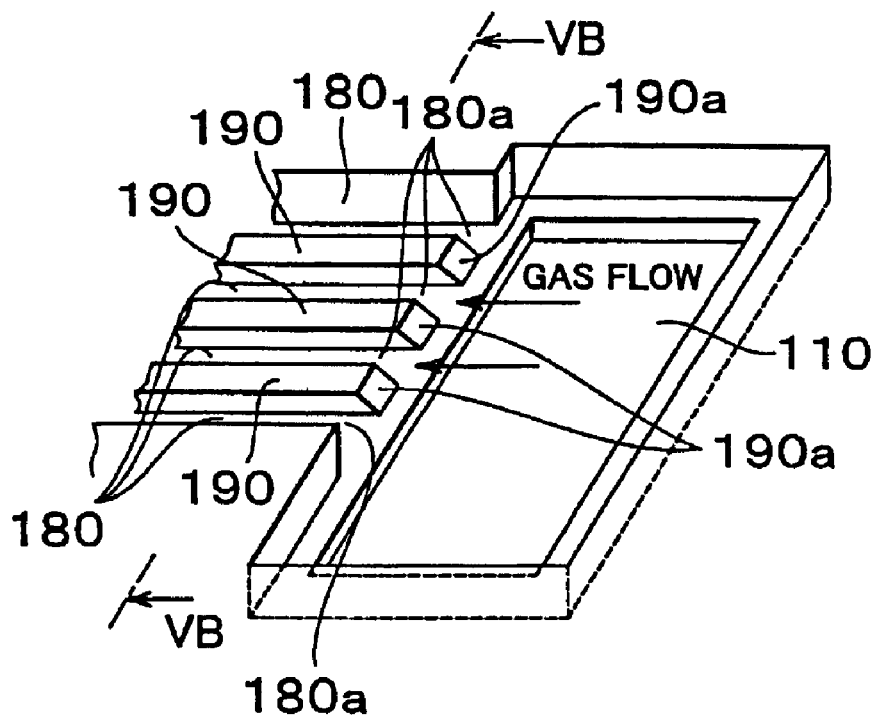
FIG. 7A is an enlarged view of an encircled region indicated by A in FIG. 6
Figure 7B:
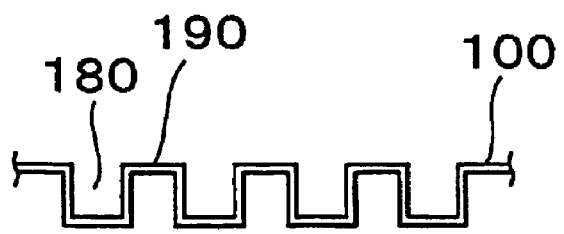
FIG. 7B is a cross-sectional view taken along a line VB—VB in FIG. 7A.
Figure 8A:
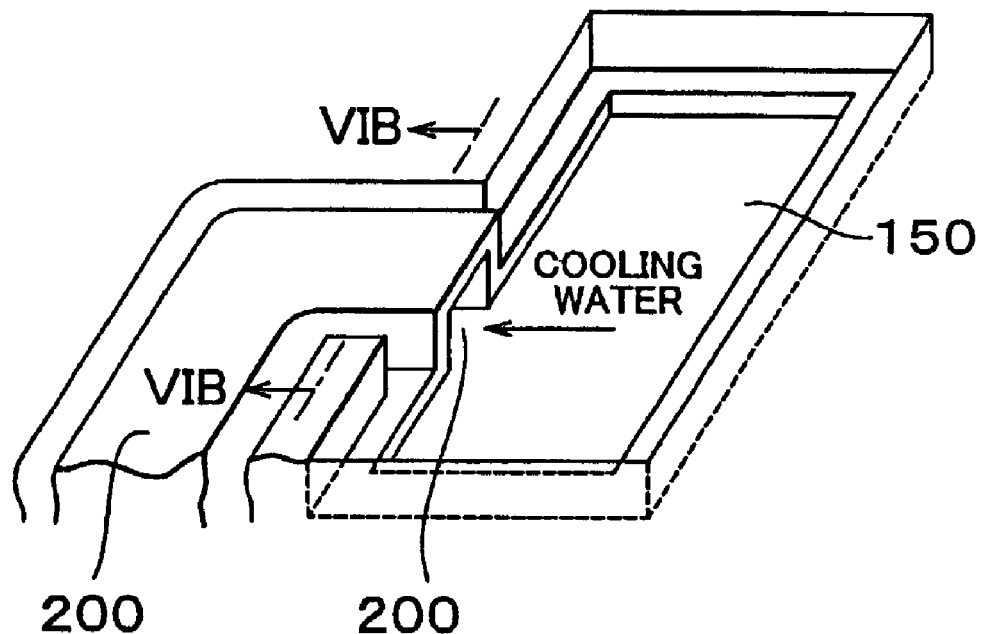
FIG. 8A is an enlarged view of are encircled region indicated by B in FIG. 6
Figure 8B:
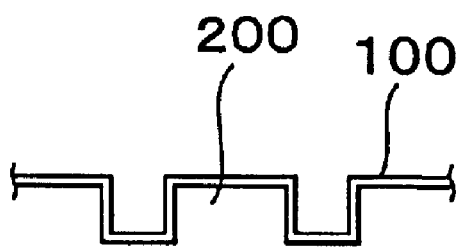
FIG. 8B is a cross-sectional view taken along a line VIB—VIB in FIG. 8A.

As shown in FIG. 3 (a cross-sectional view taken along a line IIIA—IIIA in FIG. 2) FIG. 4 and FIG. 5, if it is assumed herein that the metal separators 18A, 18B, each of which is pressed to define the gas flow channel 27 or 28 on one side thereof and the coolant flow channel 26 on the other side thereof, have a gas flow channel width (fuel gas flow channel width and oxidative gas flow channel width) $d_G$, a coolant flow channel width $D_W$, a gas flow channel cross-sectional area (fuel gas flow channel cross-sectional area and oxidative gas flow channel cross-sectional area) $S_G$, and a coolant flow channel cross-sectional area $S_W$, these parameters satisfy a relationship: $d_G \geq d_W$ or $S_W \geq S_G$. A pitch D (gas flow channel pitch=coolant flow channel pitch) satisfies a relationship: $D=d_G+d_W$. It is to be noted here in above that the gas flow channel width $d_G$ and the coolant flow channel width $d_W$ represent flow channel widths at a midpoint in the direction of depth (at a point corresponding to h when the depth is denoted by h).

In the forgoing description, if the flow channels are not grooved, for example, if flat sheets are pressed into a shape having a multitude of projections, the groove widths $d_G$, $d_W$ may not be specified. However, even, in such a case, since the flow channel height (projection height) is apparent from the following relationship: cross-sectional area=flow channel height×flow channel width, the flow channel widths can be specified. Hence, the relationship between the cross-sectional areas: $S_G \geq S_W$ has been mentioned above in addition to the relationship between the flow channel widths: $d_G \geq d_W$. In the embodiment shown in the drawings, the separators 18A, 18B, each of which defines a gas flow channel on one side thereof and a coolant flow channel on the other side thereof, are made from a metal as a material having a high thermal conductivity.

The operation of the fuel cell separator according to the invention will now be described.

Although a relationship: $d_G<d_W$ or a relationship: $S_G<S_W$ is satisfied in the separator according to the related art, the relationship: $d_G \geq d_W$ or the relationship: $S_G<S_W$ is satisfied in the separator according to the related art, the relationship: $d_G<d_W$ or the relationship: $S_G \geq S_W$ is satisfied in the fuel cell separator according to the invention. Hence, if the gas flow channel width $d_G$ of the invention is equal to the gas flow channel width $d_G$ of the related art, the coolant flow channel width $d_G$ of the invention is smaller than the coolant flow channel width $d_W$ of the related art. Even in the case where the pitch D of the invention is equal to the pitch D of the related art, the coolant flow channel width $d_W$ of the related art and the gas flow channel width $d_G$ of the related art.

Since the coolant flow channel width $d_W$ is reduced, the areas of diffusion layers 13, 16 that are pressed by groove bottom portions of the coolant flow channel of the separator are reduced, and the areas of those portions of the diffusion layers which exhibit poor diffusibility of gas to catalytic layers 12, 15 are reduced. As a result, the areas of cells which can be effectively utilized to generate electricity (the areas of the catalytic layers to which a sufficient amount of gas is diffusively supplied) are increased.

Further, since the coolant flow channel width $d_W$ is reduced, the amount of cooling water is reduced. Hence, the cells are prevented from being excessively cooled and the thermal capacity of cooling water is reduced as well, which brings about improved controllability. Further, since excessive cooling is prevented, an oxidative gas downstream portion is inhibited from being flooded by water that has been produced.

Since the flow channel defining portions of the metal separators 18A, 18B are made of the metal which exhibits a high thermal conductivity and a relatively low thermal capacity, cooling tends to be excessive. However, as long as the relationship: $d_G > d_W$ or the relationship: $S_G > S_W$ is satisfied, the amount of cooling water is small and excessive cooling can be prevented.

What is claimed is:

1. A fuel cell, the fuel cell to be fueled by a gas and cooled by a coolant, the fuel cell comprising:

at least first and second adjoining separators forming channels for said gas and coolant, each separator including:

a plate-shaped member having a first face and a second face that is formed on the other side of the first face, wherein a first concave portion formed in the first face defines a gas flow channel having a first width and a first cross-sectional area, a second concave portion formed in the second face defines a coolant flow channel having a second width and a second cross-sectional area, and the first concave portion and the second concave portion satisfy a relationship wherein the first width is greater than the second width and a relationship wherein the first cross-sectional area is greater than the second cross-sectional area.

2. The fuel cell according to claim 1, wherein a portion of the plate-shaped member that has the first face defining the gas flow channel and the second face defining the coolant flow channel is made of a material having a high thermal conductivity.

3. The fuel cell according to claim 2, wherein the material having the high thermal conductivity is a metal.

4. The fuel cell according to claim 1, wherein the plate-shaped member is at least partially pressed into a convexo-concave shape.

* * * * *